United States Patent
Singh et al.

(10) Patent No.: US 7,371,361 B2
(45) Date of Patent: May 13, 2008

(54) MAXIMUM REACTION RATE CONVERTER SYSTEM FOR EXOTHERMIC REACTIONS

(75) Inventors: Shashi P. Singh, Missouri City, TX (US); David P. Mann, Katy, TX (US); Anant Pisut, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 511 days.

(21) Appl. No.: 10/904,315

(22) Filed: Nov. 3, 2004

(65) Prior Publication Data

US 2006/0099131 A1    May 11, 2006

(51) Int. Cl.
*C01C 1/04* (2006.01)
*C01B 3/16* (2006.01)

(52) U.S. Cl. .............. 423/360; 422/148; 423/655; 423/659; 518/712; 549/248; 562/607

(58) Field of Classification Search ............. 423/360, 423/359, 361, 655, 656
See application file for complete search history.

(56) References Cited

U.S. PATENT DOCUMENTS

| | | | | |
|---|---|---|---|---|
| 1,707,417 A | * | 4/1929 | Richardson | 423/360 |
| 1,833,188 A | * | 11/1931 | Larson | 423/360 |
| 1,932,247 A | * | 10/1933 | Kniskern | 423/360 |
| 2,042,922 A | | 6/1936 | Beardsley | |
| 3,147,084 A | | 9/1964 | Franzen | |
| 3,518,284 A | | 6/1970 | Gordon | |
| 4,122,040 A | | 10/1978 | McCarroll et al. | 252/447 |
| 4,250,057 A | | 2/1981 | Foster et al. | 252/447 |
| 4,568,530 A | | 2/1986 | Mandelik et al. | 423/359 |
| 4,568,531 A | | 2/1986 | van Dijk et al. | 423/361 |
| 4,568,532 A | | 2/1986 | Benner et al. | 423/361 |
| 4,696,799 A | | 9/1987 | Noe | 422/148 |
| 4,822,521 A | * | 4/1989 | Fuderer | 252/376 |
| 5,000,926 A | * | 3/1991 | Murayama et al. | 422/197 |
| 5,167,933 A | * | 12/1992 | Norsk | 422/148 |
| 5,712,313 A | * | 1/1998 | Kramer et al. | 518/706 |
| 5,869,011 A | | 2/1999 | Lee | 422/200 |
| 6,015,537 A | | 1/2000 | Gam | 423/360 |
| 6,171,570 B1 | * | 1/2001 | Czuppon | 423/359 |
| 6,955,797 B1 | * | 10/2005 | Speth | 423/360 |
| 7,255,845 B2 | * | 8/2007 | Tonkovich et al. | 423/437.2 |

FOREIGN PATENT DOCUMENTS

DE    20301514    7/2003

\* cited by examiner

*Primary Examiner*—Wayne A. Langel

(57) ABSTRACT

An ammonia converter system and method are disclosed. The reactor can alter the conversion of ammonia by controlling the reaction temperature of the exothermic reaction along the length of the reactor to parallel the equilibrium curve for the desired product. The reactor 100 can comprise a shell 101 and internal catalyst tubes 109. The feed gas stream enters the reactor, flows through the shell 101, and is heated by indirect heat exchange with the catalyst tubes 109. The catalyst tubes 109 comprise reactive zones 122 having catalyst and reaction limited zones 124 that can comprise inert devices that function to both separate the reactive zones, increase heat transfer area, and reduce the temperature of the reaction mixture as the effluent passes through the catalyst tube 109.

8 Claims, 8 Drawing Sheets

  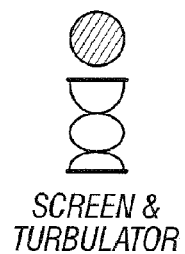 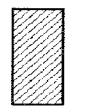
SCREEN & ROD   SCREEN & WIRE/ROD   SCREEN & TURBULATOR   METAL-FOAM
*FIG. 3*   *FIG. 4*   *FIG. 5*   *FIG. 6*
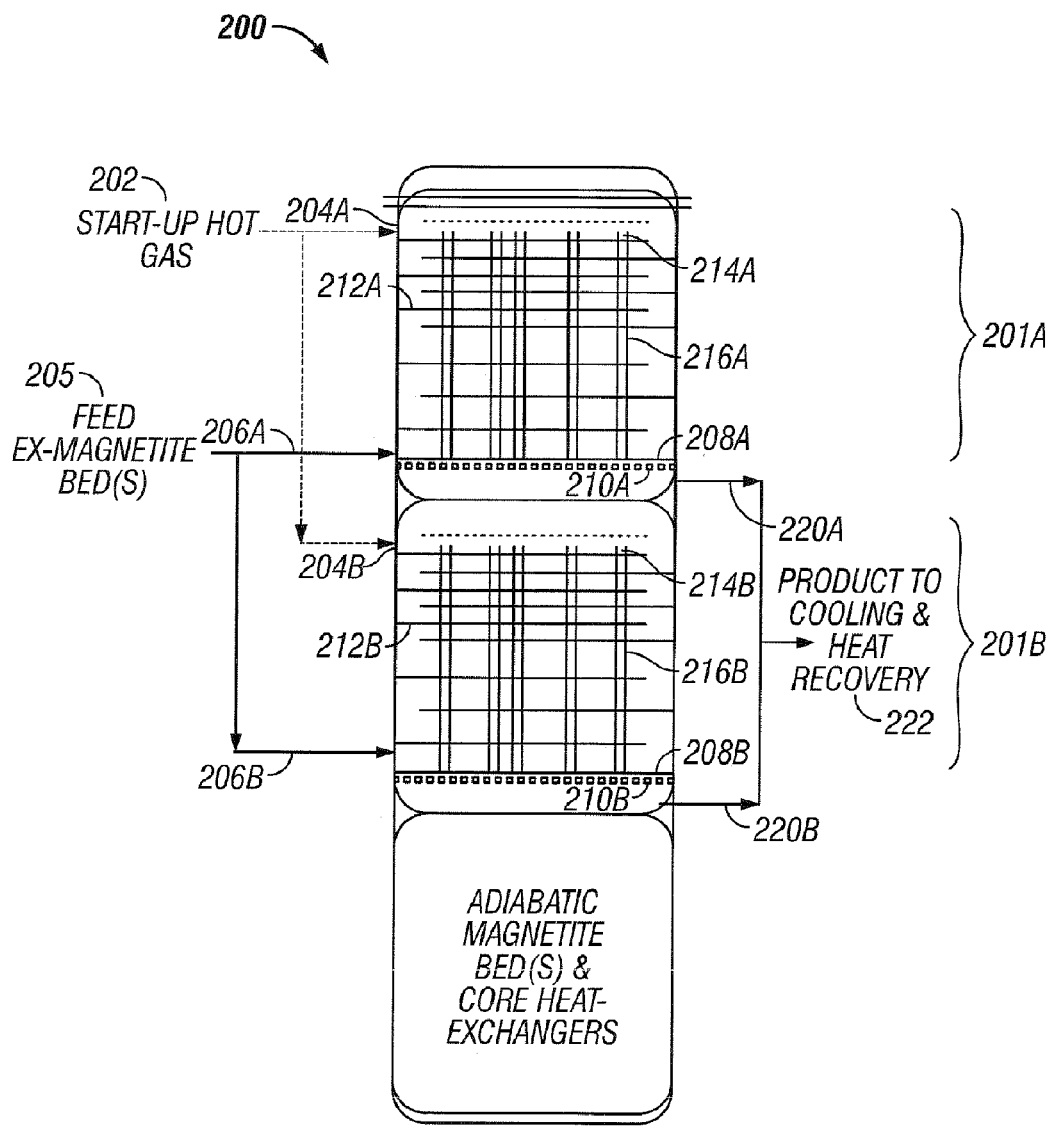
*FIG. 7*

MAXIMUM REACTION RATE CONVERTER SYSTEM FOR EXOTHERMIC REACTIONS

BACKGROUND OF THE INVENTION

This invention relates to a converter for exothermic reactions, and more particularly to a converter and method such as for converting nitrogen and hydrogen to ammonia whereby reduced catalyst usage and/or greater product yields are obtainable.

Ammonia is commonly manufactured by reacting nitrogen and hydrogen in a synthesis loop which can include a compressor, an ammonia synthesis reactor, and an ammonia condensation and recovery step. Unreacted synthesis gas from the synthesis reaction is typically recycled from the ammonia separator back to the compressor and reactor. The synthesis gas can contain argon, methane, and other inert components which are typically removed as a purge stream, thereby avoiding buildup of inerts in the synthesis loop. The purge gas can be further processed in a hydrogen recovery unit, or alternatively supplied directly to the fuel system with or without additional treatment or hydrogen recovery.

Many ammonia production plants operate with a synthesis loop using an iron-based magnetite catalyst in the ammonia converters. Significant advances in the manufacture of ammonia have included the use of highly active synthesis catalysts comprising a platinum group metal supported on graphite-containing carbon, used alone or in conjunction with less active iron based catalysts, as described in U.S. Pat. Nos. 4,568,530, 4,568,531, and 4,568,532. Desirably, the platinum group metal is ruthenium, as more fully described in U.S. Pat. Nos. 4,122,040 and 4,250,057. The highly active catalysts generally allow for increased ammonia production and/or the usage of smaller volumes of catalyst.

In general, contact of the reactants with a catalyst under suitable temperature and pressure conditions effects an exothermic reaction. The heating associated with exothermic reactions can have various positive and negative effects on the reaction. Negative effects can include: poor production rates, deactivation of catalyst, production of unwanted by-products, and damage to the reaction vessel and piping. Most commonly, an excessive temperature increase in the reaction zone either limits selectivity or reduces product yield.

Exothermic reaction processes can encompass a wide variety of feedstocks and products. Examples of moderately exothermic processes can include methanol synthesis, ammonia synthesis, and the conversion of methanol to olefins. Examples of highly exothermic reactions can include oxidation reactions in general, phthalic anhydride manufacture by naphthalene or orthoxylene oxidation, acrylonitrile production from propane or propylene, acrylic acid synthesis from acrolein, the conversion of n-butane to maleic anhydride, the production of acetic acid by methanol carbonylation, and methanol conversion to formaldehyde.

The efficiency of reversible exothermic reactions often depends on the ability to remove the heat generated by the process. The reaction rate and equilibrium generally move oppositely with increasing temperature. Thus, higher reaction temperatures generally result in faster reaction rates and lower overall conversion, while lower reaction temperatures generally result in slower reaction rates and higher overall conversion. For increased conversion in staged reversible exothermic reactions, a high temperature is employed in the early stages of the reaction where the reaction kinetics are more favorable. As the reaction progresses, the temperature in the later stages is reduced to take advantage of the more favorable equilibrium conditions. However, because the reaction is done in stages with interstage cooling, the equilibrium and kinetics are rarely, or only for very briefly, balanced for the maximum reaction rate possible. The present invention employs conditions approximating the optimal reactor operating curve (or temperature progression) which maximizes the reaction rate along a path corresponding to a locus of maximum rates on a temperature-conversion plot. This type of plot generally follows a decreasing temperature profile moving from the reactor inlet to outlet.

Some prior art reactors have relied upon arrangements that contain the reactions in generally adiabatic reactor zones and supply indirect contact with a cooling medium between stages. The geometry of intercooled reactors poses layout constraints that require large reactors and vast tube surfaces to achieve high heat transfer efficiencies. In U.S. Pat. No. 4,696,799, Noe discloses an ammonia synthesis converter having shell and tube interchangers for cooling the reaction gas streams leaving the catalyst beds with incoming reactant gases. In U.S. Pat. No. 5,869,011, Lee discloses a fixed bed reactor that partitions a single stage catalyst bed into multiple heat interchanged stages in a single reaction vessel.

In U.S. Pat. No. 6,171,570, Czuppon discloses maintaining a substantially isothermal condition by boiling water on the shell side of a shell-and-tube reactor with catalyst-filled tubes. Disclosed advantages include lower energy consumption, lower purge rates, and higher ammonia production rates. While overall catalyst efficiency can be better than is found in reactors operating at adiabatic conditions, of course, the isothermal condition means that towards the outlet of the reactor, the reaction composition may still approach equilibrium product concentrations, thus limiting further reaction. For an exothermic reaction such as ammonia production from hydrogen and nitrogen, the product ammonia concentration at the outlet end of an isothermal reactor can be higher than the product concentration at the outlet of the adiabatic reactor given sufficient reaction time. This is true because in the adiabatic reactor, with an exothermic reaction such as ammonia production from hydrogen and nitrogen, temperatures increase along the reactor length and the equilibrium product concentration of ammonia is lower at higher temperatures.

Adiabatic fixed bed reactors with interstage cooling have been used in the prior art to provide successive conversion at lower and lower temperatures to improve catalyst efficiency and improve yields. In practice, prior art reaction processes have been limited to two to four stages in one common reactor vessel, with the major limitation being the capital costs associated with interstage heat exchange equipment and multiple reactor stages and/or vessels. In addition, inlet temperature at each bed is necessarily lower than the outlet temperature, which is closer to the equilibrium temperature. For example, in U.S. Pat. No. 6,015,537, Gam discloses a reactor for the preparation of ammonia from a synthesis gas featuring multiple catalyst beds with intermediate cooling of partially converted synthesis gas between each catalyst individual bed.

In one commercially available prior art ammonia process, four catalysts beds are provided with inter-cooling between each of the beds. The first bed, and sometimes the second bed, can feature an iron-based magnetite catalyst, followed by two or three beds which contain a ruthenium-based catalyst. Reactor temperature at the inlet of each catalyst bed is low due to the increasing temperature profiles in the adiabatic exothermic ammonia synthesis reaction zones. The exothermic nature of the reaction, together with the adiabatic reactor bed design, do not allow the temperature profile to maximize per-pass ammonia conversion, in turn leading to inefficient catalyst use. In such a system, larger amounts of the catalyst are necessary to achieve higher per pass ammonia conversion.

Similarly, isothermal reactors have limitations in the production of ammonia. Synthesis of ammonia using an isothermal reactor generally requires separate external pre-heating of the feed gas. Additionally, as with the staged adiabatic reactors, typical isothermal reactors have relatively high catalyst requirements to obtain equivalent conversion rates.

Accordingly, there is a need in the art for a reactor design which controls the temperature of exothermic reactions along the length of the reactor that effectively utilizes a temperature:conversion operating curve that follows the equilibrium curve with a negative temperature offset, and thus maintains a high reaction rate and catalyst efficiency throughout the catalyst bed volume.

SUMMARY OF THE INVENTION

The present invention is directed to a conversion process and apparatus for synthesis of ammonia, for example, wherein reaction temperature along the length of the reactor can be controlled, resulting in decreased catalyst volumes and increased conversion. The reaction temperature can be reduced along the length of the reactor, to follow the equilibrium curve for the desired product such that the product concentration increases along the length of the reactor but never reaches the equilibrium product concentration at the current reaction mixture temperature.

The present invention provides, in one embodiment, a conversion process useful for ammonia synthesis, comprising: (a) introducing a gaseous reactant-rich stream at a feed temperature into a heat exchange passage of a heat exchanging reaction zone to pre-heat the reactant-rich stream to an inlet temperature; (b) introducing the pre-heated reactant-rich stream at the inlet temperature into a countercurrent catalyst-containing reaction passage to exothermically convert the reactant gas to a product gas to form a product-enriched mixture of the reactant and product gases; (c) indirectly transferring heat from the reaction passage to the heat exchange passage at a rate effective to maintain the mixture of gases below the equilibrium temperature; and (d) recovering an effluent from an outlet from the reaction passage at a discharge temperature enriched in the product gas.

The product-enriched mixture can have a product equilibrium concentration that increases with decreasing temperature and a reaction rate coefficient that increases with increasing temperature. The heat transfer rate in a decreasing-temperature section of the reaction passage can exceed the heat of reaction to lower the temperature of the mixture gases to a discharge temperature. The reactant gas can include a mixture of nitrogen and hydrogen and the product gas can comprise ammonia. The catalyst can include a transition metal and in one embodiment can include platinum group metal. The catalyst can include ruthenium on a carbon support and in one embodiment can include promoted ruthenium on a heat stabilized graphitic carbon support. The heat exchanging reaction zone can include a shell and tube heat exchanger, the heat exchange passage can comprise a shell-side passage through the heat exchanger, and the reaction passage can include a plurality of tubes containing catalyst. The reaction passage can include a plurality of alternating catalyst-containing zones and reaction-limited zones in series. The reaction passage section can be maintained at a temperature within 30° C. of an equilibrium temperature of the gas mixture. The reaction passage can include an adiabatic initial zone adjacent an inlet of the reaction passage wherein the heat of reaction exceeds the rate of heat transfer whereby the temperature of the gas mixture rises. The reaction limited zones can be non-reactive and can be free of catalyst.

The present invention provides, in another embodiment, a conversion process for the synthesis of ammonia, comprising: (a) introducing a reactant-rich stream comprising hydrogen and nitrogen at a feed temperature into a shell-side passage of a shell-and-tube heat exchanging reactor to pre-heat the reactant-rich stream to an inlet temperature; (b) introducing the pre-heated reactant-rich stream from the shell-side passage at the inlet temperature into a reaction zone containing a plurality of catalyst-containing tubes to convert the hydrogen and nitrogen to ammonia to form an ammonia-enriched mixture of hydrogen, nitrogen and ammonia; (c) indirectly transferring heat from the tubes to the reactant-rich stream at a rate effective to maintain the mixture in the tubes below equilibrium temperature, wherein the heat transfer rate in a decreasing-temperature section of the reaction zone exceeds heat of reaction to lower the temperature of the mixture to a discharge temperature; and (d) recovering an effluent at the discharge temperature from outlet ends of the tubes enriched in ammonia and lean in nitrogen and hydrogen.

The catalyst can include a transition metal and in one embodiment can include a platinum group metal. The catalyst can include ruthenium on a carbon support and in one embodiment can include promoted ruthenium on a heat stabilized graphitic carbon support. The tubes can include an initial temperature-increasing zone adjacent an inlet of the reaction passage wherein a heat of reaction exceeds the rate of heat transfer and the temperature of the gas mixture is increasing. The tubes can include a series of alternating catalyst-containing zones and reaction-limited zones. The mixture in the decreasing temperature section can be maintained at a temperature within 30° C. of the equilibrium temperature for the reaction. The method can further include passing the reactant-rich stream through an upstream reactor comprising magnetite catalyst, and supplying an effluent from the magnetite reactor in series as the reactant-rich stream introduced shell-side to the shell-and-tube heat exchanging reactor. In one embodiment, the reactant-rich stream introduced shell-side to the shell-and-tube heat exchanging reactor can include a purge gas stream from an ammonia synthesis loop. The catalyst tubes can be vertical and the gas mixture can flow downward through the tubes. The tubes can include an initial temperature-increasing zone adjacent an outlet of the reaction passage wherein a heat of reaction exceeds the rate of heat transfer and the temperature of the gas mixture is increasing. The reaction limited zones can be non-reactive and can be free of catalyst. The decreasing temperature section can be maintained over a range of temperatures that follow the ammonia concentration vs. temperature equilibrium curve for the reactor pressure, maintaining a high reaction rate and high catalyst efficiency throughout the reactor.

In another embodiment, the invention provides a converter for ammonia synthesis, comprising: (a) means for introducing a gaseous reactant-rich stream at a feed temperature into a heat exchange passage of a heat exchanging reaction zone to pre-heat the reactant-rich stream to an inlet temperature; (b) means for introducing the pre-heated reactant-rich stream at the inlet temperature into a catalyst-containing reaction passage to exothermically convert the reactant gas to a product gas to form a product-enriched mixture of the reactant and product gases having a product equilibrium concentration that increases with decreasing temperature and a reaction rate coefficient that increases with increasing temperature; (c) means for indirectly transferring heat from the reaction passage to the heat exchange passage at a rate effective to maintain the mixture of gases below the equilibrium temperature, wherein the heat transfer rate in a decreasing-temperature section of the reaction passage exceeds heat of reaction to lower the temperature of the mixture of gases to a discharge temperature; and (d) outlet means from the reaction passage for recovering an effluent enriched in the product gas at the discharge temperature.

The converter can include means to limit heat transfer from the reaction passage to the heat exchanger passage near the catalyst tube outlet section. The reactant gas can comprise a mixture of nitrogen and hydrogen, and the product gas can comprise ammonia. The catalyst can include a transition metal, and in one embodiment can include a platinum group metal. The catalyst can include ruthenium on a carbon support and in one embodiment can include a promoted ruthenium on a heat-stabilized graphitic carbon support. The heat exchanging reaction zone can include a shell and tube heat exchanger. The heat exchange passage can include a shell-side passage through the heat exchanger and the catalyst-containing passage can include a tube-side passage through a plurality of vertical parallel tubes containing the catalyst. The reaction passage can include a generally adiabatic initial zone adjacent an inlet of the reaction passage wherein the heat of reaction exceeds the rate of heat transfer and the temperature of the gas mixture rises. The reaction passage can also include a plurality of alternating catalyst-containing zones and reaction limited zones. The reaction limited zones can be non-reactive and can be free of catalyst. The converter can further include means for maintaining the temperature of the gas mixture in the tubes within 30° C. of equilibrium temperature for the ammonia concentration as the gas mixture passes through the tubes.

In another embodiment, the invention provides a converter for ammonia synthesis, comprising: (a) a shell-and-tube heat exchanging reactor comprising a shell-side heat exchange passage and a reaction passage comprising a plurality of catalyst containing tubes; (b) an inlet for introducing a reactant-rich stream comprising hydrogen and nitrogen at a feed temperature into the heat exchange passage to pre-heat the reactant-rich stream; (c) an inlet for introducing the pre-heated stream to the reaction passage; (d) a series of alternating catalyst containing reaction zones and reaction limited zones in the tubes, to convert the hydrogen and nitrogen to ammonia to form an ammonia-enriched mixture of hydrogen, nitrogen and ammonia; and (e) an outlet from the reactor for recovering an effluent from the tubes at the discharge temperature enriched in ammonia and lean in nitrogen and hydrogen.

The shell-side passage can include a plurality of baffles to direct a flow of the reactant rich stream across the reaction tubes. Spacings between baffles in the shell-side passage can be variable, for example, with closer spacing of the baffles near the inlet end of the reaction tubes and increased spacing between adjacent baffles near the outlet end of the reaction tubes. The reaction tubes can include a series of alternating catalyst-containing zones and reaction-limited zones. The catalyst can include a transition metal and in one embodiment can include platinum group metal. The catalyst can include ruthenium on a carbon support and in one embodiment can include promoted ruthenium on a heat stabilized graphitic carbon support. The insert devices can be selected from the group consisting of: screens and rod; screens and wire mesh; screens and twisted tape; metallic or ceramic structured packing; metallic or ceramic mesh pads; metal or ceramic foam; and structured metallic packing. The converter can further include an upstream reactor comprising magnetite catalyst and a discharge operatively connected to the converter inlet. The converter can further include a plurality of the shell-and-tube heat exchanging reactors with the converter inlets connected to the discharge from the magnetite reactor in parallel flow. The reactant-rich stream can be introduced shell-side to the shell-and-tube heat exchanging reactor and in one embodiment can include a purge gas stream from an ammonia synthesis loop. The converter can include tube shields to limit heat transfer from the reaction passage to the heat exchanger passage near the tube outlet section. The tubes can be vertical and the gas mixture can flow downward through the tubes. The tubes can include an adiabatic section adjacent an inlet of the reaction passage wherein a heat of reaction exceeds the rate of heat transfer and the temperature of the gas mixture rises.

BRIEF DESCRIPTION OF THE DRAWINGS

FIG. 3 is a schematic drawing of one embodiment of the insert device used in the catalyst tube of FIG. 2.

FIG. 4 is a schematic drawing of an alternate embodiment of the insert device used in the catalyst tube of FIG. 2.

FIG. 5 is a schematic drawing of an alternate embodiment of the insert device used in the catalyst tube of FIG. 2.

FIG. 6 is a schematic drawing of an alternate embodiment of the insert device used in the catalyst tube of FIG. 2.

FIG. 7 is a schematic drawing of a multiple-bed converter arrangement of an alternate embodiment of the invention.

DESCRIPTION OF THE INVENTION

The invention will be described by way of examples with reference to FIGS. 1-13 which are not to be construed as a limitation upon the apparatus elements and process steps of the invention. The present invention is directed to a synthesis reactor for exothermic reactions which can better approximate the equilibrium temperature/concentration curve for the conversion of reactants to products. Catalyst usage and reaction yields can be improved over existing isothermal and staged adiabatic reactor processes. The advantages of the present invention are accomplished by withdrawing heat from the catalyst-filled tubes of the converter to maintain the reaction temperature within the bulk of the length of the catalyst-filled tubes close to an optimum. Within this application the terms reactor and converter can be used interchangeably.

Figure 1:
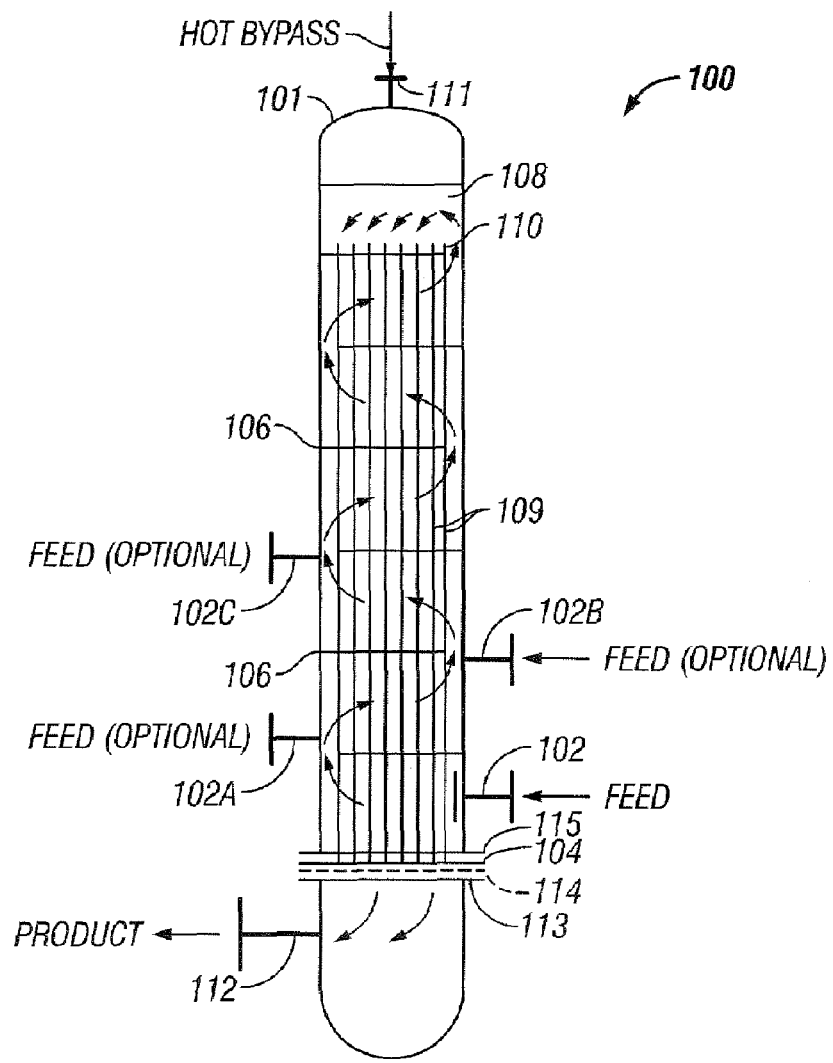
FIG. 1 is a schematic side sectional drawing of an ammonia converter according one embodiment of the invention.

Examples of commercially practiced exothermic-type gas phase catalytic reactions which can be practiced in reactor 100, as depicted in FIG. 1, include: synthesis reactions for producing ammonia, synthesis reaction for producing methanol, shift reaction for producing CO and $H_2$, methanation, hydrocarbon oxidation for synthesizing maleic anhydride; other exothermic reactions mentioned above; and the like. The reactor of the present invention is particularly well suited for the synthesis of ammonia, which is used hereinafter as an example for the purpose of illustration. Catalyst usage, reaction rates and total ammonia conversion can be improved over the existing technology employing multi-bed adiabatic catalyst beds and heat exchangers between the beds to cool the gas feed.

To maintain equilibrium favoring the synthesis of products in exothermic reactions, heat is typically removed as the reaction progresses. Generally, more heat is removed at the beginning of the reaction than is removed at the end of the reaction. The temperature profile of the catalyst tube can be maintained whereby the highest temperatures are generated at the inlet of the catalyst tube (i.e. near the top end of the tube with downward gas flow) and the temperatures at the outlet of the catalyst tube can be maintained at a minimum effective catalyst temperature to ensure high conversion rates. The rate of conversion can be greater near the inlet end of the catalyst tube as the concentration of ammonia can be low at this point of the reaction and the high temperature ensures favorable kinetics. The rate of conversion can be lower near the outlet end of the catalyst tube and more catalyst volume is required per unit mass of product generated. The rate of heat generation can be relatively low when compared to the heat transfer potential due to high surface area which becomes available as increased catalyst is loaded at the lower end of the catalyst tube. To prevent overcooling of the reaction gas, part of the heat transfer surface area can be to be blocked so that heat transfer is inhibited in the blocked area.

Figure 1A:
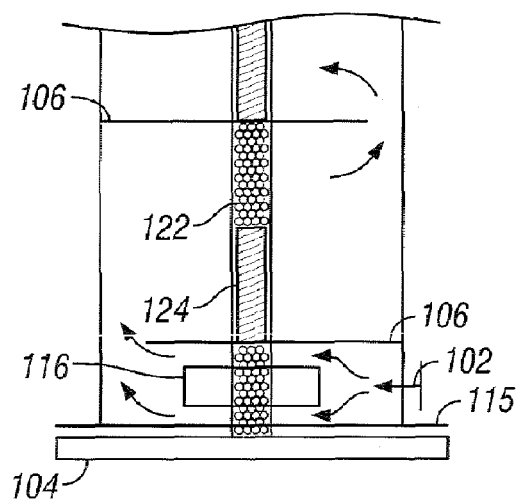
FIG. 1A is an enlarged schematic side section view of another embodiment of the lower portion of the ammonia converter of FIG. 1.
Figure 2:
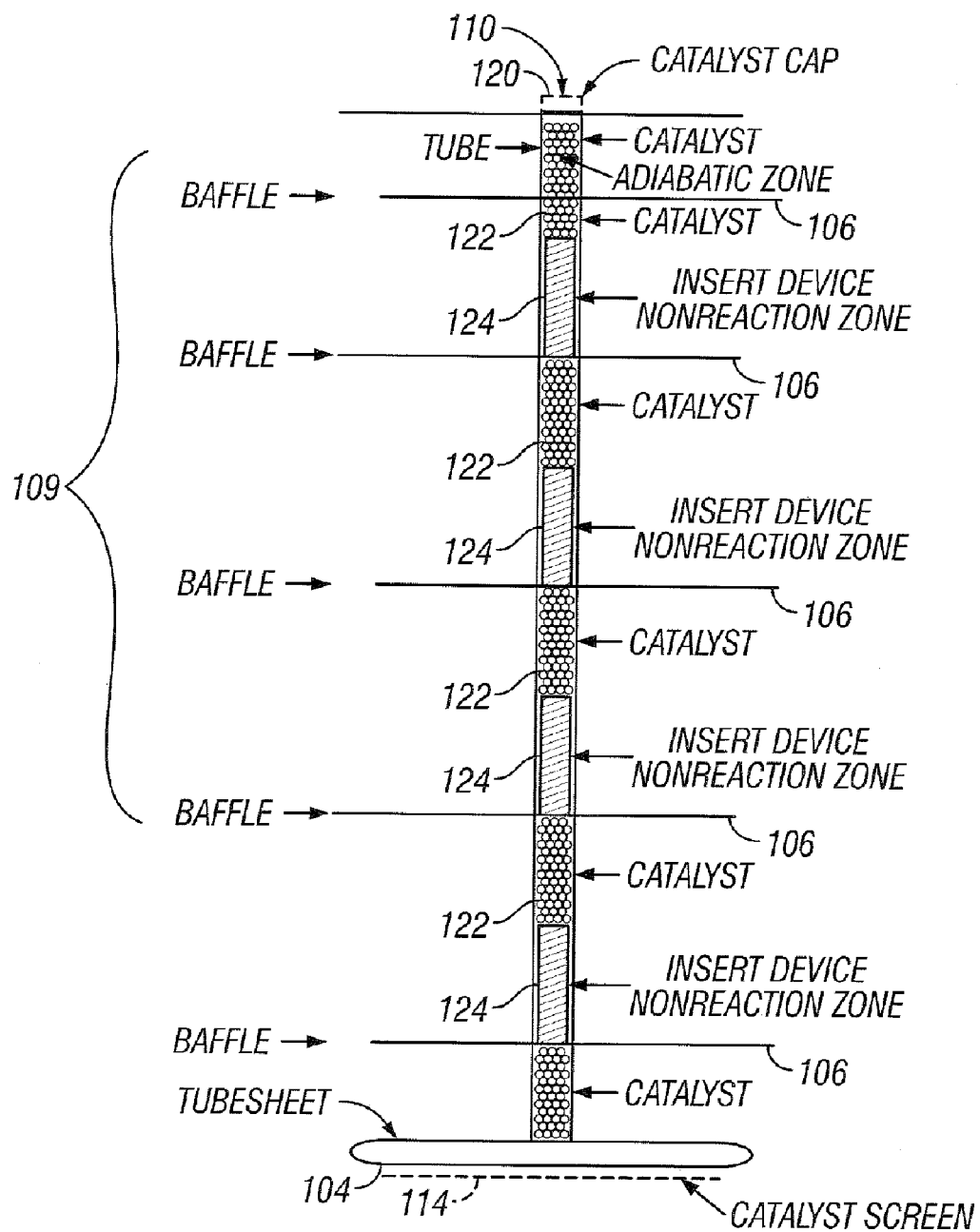
FIG. 2 is a schematic side sectional view of a catalyst tube in the converter of FIG. 1.

Referring to FIGS. 1 and 2, there is provided a reactor 100 consisting of a shell 101, baffles 106, internal catalyst tubes 109, and tube shields 116. As shown in FIG. 1A, a number of shields (116) can be provided throughout the reactor to block flow to the respective heat transfer surface area. The vertical height of the shield 116 can be selected to approximate the catalyst temperature profile as close to the maximum reaction rate profile as possible, by reducing the catalyst tube area exposed to and cooled by the inlet feed stream. The blocker device can be formed by using two consecutive spacers or baffles on the shell side. The feed stream enters reactor 100 through inlet 102, located near the bottom of the reactor shell and flows upward through a series of horizontal baffles 106. The feed stream can be preheated through indirect heat exchange with the catalyst tubes 109 located vertically inside the reactor shell 101. Optionally, the feed stream can be preheated upstream of the reactor inlet 102. If desired, additional feed inlets, shown as 102A, 102B and 102C, can be added to the reactor shell 101. The feedstock temperature can be controlled by installing a bypass downstream from a preheater (not shown), whereby cold gas can be mixed with a portion of the preheated gas to obtain an optimum inlet temperature. The baffles can, if desired, have variable spacing between adjacent individual baffles to help gradually increase heat transfer on the approach to the inlet end 110 of the catalyst tube 109. For example, the spacing between adjacent baffles can be less near the top of the reactor than at the bottom of the reactor. The catalyst tubes 109 are desirably supported on a tubesheet 104, in a conventional manner such as by welding the tubes 109 to the tubesheet 104, or any other method known in the art. Tubesheet 104 separates the tube side (reaction product) from the shell side (feed stream) of the reactor 100.

The reactor 100 can include a diffuser plate (not shown) located at the upper portion of the reactor near the inlet to the catalyst tubes to ensure proper mixing of the feed gases. A bypass inlet 111 can be positioned at the top of the reactor 100 and can provide a preheated feed stream if desired. Bypass inlet 111 can be used to control the temperature of the feed gas at the inlet to the catalyst tubes 109. A diffuser plate (not shown) can be located near the bypass inlet 111 to ensure proper mixing with the feed supplied to inlet 102. The feed stream enters catalyst tubes 109 through catalyst tube inlets 110 located at the uppermost portion of the vertical catalyst tubes 109. Generally, the feed stream flows countercurrent to the direction of the flow through the catalyst tubes 109, i.e. the reactant gas flows upward in the shell-side of the reactor and downward through the catalyst tubes. The converted effluent exits the catalyst tubes 109 at the catalyst tube outlet 112, located at the lower most portion of the catalyst tube 109 and the lower portion of the reactor 100. A screen 114 located below the tubesheet 104 prevents loss of catalyst to the outlet zone of the reactor. The product effluent can exit the reactor 100 through reactor outlet 112.

Referring now to FIG. 2, the cross sectional detail of the catalyst tube 109 located in reactor 100 is provided. The catalyst tube is desirably between 25 and 75 mm in diameter, more desirably between 38 and 63 mm in diameter. The catalyst tube length is desirably between 3 and 8m, more desirably between 4 and 6m. The tube consists of alternating reactive zones 122 and reaction limited zones 124. The reactive zones 122 can consist of high activity catalyst and the reaction limited zones 124 can consist of non-reactive spacer insert devices designed to separate the catalyst zones and transfer a portion of the heat of reaction to the shell side of the reactor. The reaction limited zones can be non-reactive and in one embodiment the reaction limited zones can be free of catalyst. Baffles 106 can be located within the interior of the reactor shell 101 to guide the fluid flow and facilitate heat transfer between the feed stream and the catalyst tubes 109. The catalyst tube 109 can be supported at the base by tubesheet 104. Catalyst screen 114, located at the bottom of the catalyst tube, facilitates catalyst retention at the bottom of tube 109. The catalyst tube can also consist of a screen or cap 120 located at the uppermost portion of the vertical tube.

Typically, the converter can be sized and designed based upon the operating conditions of the catalyst as the activity of the catalyst decreases. To achieve good operability over the entire run, including at the start of the run when the catalyst activity is high, cooling in the lower portion of the converter can be minimized or eliminated. One or more bypass inlets 102A, 102B and 102C (see FIG. 1) can be used to bypass the cooling section for the corresponding lower portion of the catalyst tubes 109. The bypass feature can be used depending on operating conditions and activity of the catalyst and can be used to avoid overcooling of the catalyst when the operating conditions are different than those used when sizing the converter. Overcooling the catalyst can cause the reaction to run at a temperature too low to obtain optimum conversion of the reactants at the outlet end of the catalyst tube.

Because the catalyst tubes can be mounted in a vertical arrangement, the screen 114 located at the bottom plays an important role in retaining catalyst particles in the tube 109. Screens such as Johnson Vee-Wire screens supplied by UOP can be well suited for use in the converter system. The insert devices 124 can comprise a variety of shapes as shown in FIGS. 3-6. Alternatively, twisted tape inserts, such as for example, turbulators manufactured by Brown Fintube, HiT-RAN® Matrix Element manufactured by CalGavin Co., or static mixers available from a variety of manufacturers and welded to a Johnson screen, can be used as the insert device 124 for the non-reactive or reduced activity zone. The insert devices 124 can be constructed from a variety of materials, selected based upon the heat transfer properties of the chosen material. The insert devices 124 can be fixed in place within the catalyst tube 109, or optionally, they can be placed between layers of catalyst 122 whereby the insert devices 124 can move cooperatively with the catalyst 122, as catalyst settling may occur during normal operation. Depending on the type of insert device 124, it can be desirable to weld the insert devices to a rod to maintain reactive zones of a certain catalyst volume and a certain location, thereby preventing the catalyst zones 122 from moving within the tube 109. It is anticipated that the catalyst volume of a given reactive zone can vary by up to 10%, from the beginning of the reaction until the end of the reaction, as catalyst settling can occur during operation of the reactor.

A variety of materials, such as for example, insert elements and screens can be used as the insert devices 124 for the non-reactive or reduced activity zone within the catalyst tube 109, including: screens and rod; screens and wire mesh; screens and twisted tape; metal foam, static mixing type inserts; and the like. The screen can be attached with a seal (e.g. a leaf type seal) about the circumference of the insert 124. A means to inhibit catalyst from passing through, or lodging between, the screen and tube wall can also be provided. The means of inhibiting catalyst from passing through or around the non-reactive or reduced activity zone can compensate for typical variations in reactor tube diameter and tube cross-sectional ovality. Ideally, the insert devices 124 can perform multiple functions including, but not limited to, providing a non-reactive or reduced activity zone within the catalyst tube 109, enhancing heat transfer between the shell and tube side of the reactor, and enhancing mixing of fluids on the tube side of the reactor. Twisted tape inserts can be used as the insert device 124, desirably having a length coextensive with the desired length of the reduced reactivity or non-reactive zone. The twisted tape can have an outer diameter that is approximately equal to the inner diameter of the tube, such that a ratio of the tube diameter to the packing diameter is approximately 1. The insert can also be one or more stacked pieces of metallic structured packing, such as Sulzer Type DX, Type EX, or Type DXM/DYM laboratory packing made by Sulzer Chemtech designed to fit closely within the inner diameter of the reactor tubes. One or more shorter length pieces of the structured packing can be stacked end-to-end in various multiples and combinations to form a number of different length non-reactive or reduced activity zones interspersed with different length zones of the reactive catalyst as required to achieve the desired configuration. Similarly, the non-reactive insert can be one or more metallic mesh pads, such as Hyperfil® High Efficiency Column Packing, a knitted mesh distillation packing made by Enhanced Separation Technologies, LLC. The metallic mesh pads can be designed to fit closely within the inner diameter of the reactor tubes and can be stacked end-to end when multiple pads are used to create a single contiguous non-reactive zone of the desired length. This can reduce the complexity of the insert fabrication.

The non-reactive insert can be ceramic foam in another embodiment. The ceramic foam can be made by filling voids in an organic sponge with a fluidized ceramic precursor and burning the substrate away to form the ceramic foam. Advantageously, the ceramic foam can be cut into shorter lengths, and can be stacked end-to-end in each tube to achieve a limited or non-reactive zone of the desired length.

A variety of catalysts can be used with the present invention, including traditional ammonia synthesis magnetite-based catalysts. Desirably, a ruthenium based catalyst can be used in the reactor catalyst tubes. The ruthenium catalyst can have an effective diameter of between 1.5 and 2.0 mm, and can be formed in a variety of shapes, on a carbon-based support material. The catalyst can be a promoted ruthenium on a heat stabilized carbon support. The ruthenium based catalyst can exhibit an activity up to 20 times greater than magnetite, and performance can be maintained at high ammonia concentrations and over a wide range of hydrogen-to-nitrogen ratios. Additionally, the ruthenium catalyst can allow the ammonia synthesis to be conducted at lower pressures than needed for synthesis performed with magnetite catalyst.

Replacement of the catalyst can be accomplished in a variety of ways. As illustrated in FIG. 1, the reactor 100 can feature a connection at flanges 113,115, allowing the separation and removal of the top portion of shell 101 to access the catalyst tubes 109. The tubesheet 104 can be fixed in place and catalyst can be removed from the tubes via vacuum means. Alternatively, the reactor 100 can be arranged with flanges 113,115 located at the top of the reactor shell 100. With such an arrangement, the catalyst tubes 109 and tubesheet 104 are then supported at the top of the reactor shell 101 and the entire bundle 104 and 109 can be removed for replacement of catalyst.

In another embodiment of the present invention, shown in FIG. 7, multiple reactors can be used in parallel. Vessel 200 features two reactors, 201*a* and 201*b*, each having vertical catalyst tubes 216*a* and 216*b*, arranged in parallel. A first feed stream start up gas 202 is introduced to the parallel reactors 201*a* and 201*b* at inlets 204*a* and 204*b* respectively, each located at the top of their respective reactors. The start up gas 202 can be preheated as desired. Inlets 204*a* and 204*b* can be located above the tops of the catalyst tubes 216*a* and 216*b* located within the reactors 201*a* and 201*b*, respectively. A second feed stream 205 from a synthesis loop using lower activity catalysts, such as for example, magnetite, can be introduced to the reactors via inlets 206*a* and 206*b*, located near the base of the catalyst tubes 216*a* and 216*b*. The reactors 201*a* and 201*b* can include a series of baffles 212*a* and 212*b* through which second feed stream 205 passes and undergoes indirect heat exchange with the catalyst tubes 216a and 216b. The baffles 212a and 212b can optionally be spaced closer at the upper most portion of the reactor, as illustrated in FIG. 7, and can thereby increase heat exchange between the second feed stream 205 and the upper portion of the catalyst tubes 216a and 216b. The first heated start-up feed stream 202 and heated second feed stream 205 enter the catalyst tubes 216a and 216b at inlets 214a and 214b, respectively. The catalyst tubes 216a and 216b can feature alternating reactive and non-reactive zones, as previously described and illustrated in FIG. 2. Product effluent exits the catalyst tubes 216a and 216b, passes through catalyst screens 210a and 210b, and exits reactors 201a and 201b via outlet 220a and 220b. Product effluent from reactors 201a and 201b can be combined to form a product effluent 222, which can be introduced into a series of heat exchangers (not shown) to cool the product and indirectly heat the feed gas, or can optionally be used for other heat recovery processes. In a similar fashion, the converter can be used in conjunction with an upstream fixed bed magnetite reactor (not shown). Generally adiabatic magnetite bed(s) and core heat exchangers can also be housed in the vessel 200 as indicated in FIG. 7.

Figure 8:
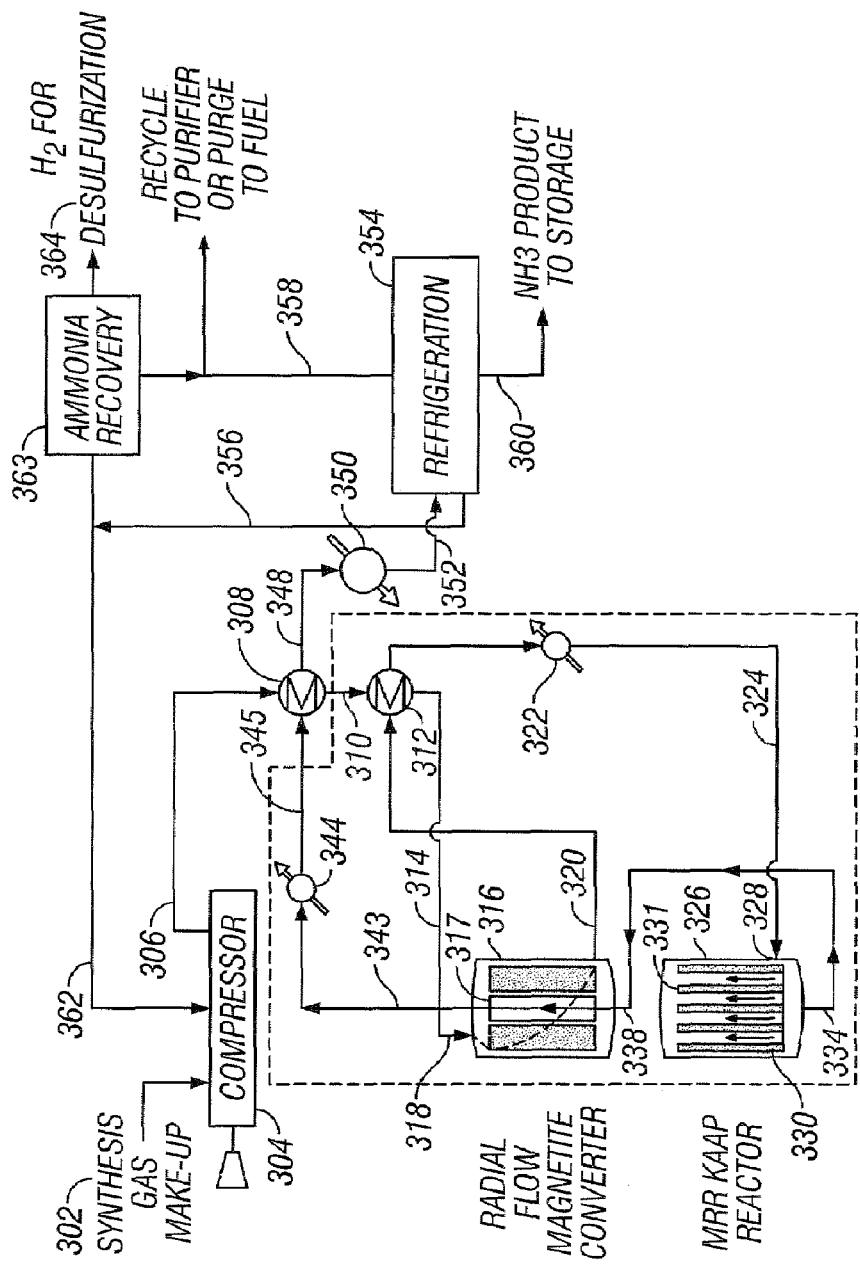
FIG. 8 is a process schematic of an ammonia synthesis loop with a converter according to an alternate embodiment of the invention.

A process schematic of an example of an ammonia synthesis loop having a converter according to another embodiment of the invention is shown in FIG. 8. Synthesis feed gas 302 enters compressor 304, and in the example shown, the exiting gas has a temperature of 70° C. (158° F.) and a pressure of 9.43 MPa. If desired, a cryogenic purification step can be used to provide high purity makeup gas to the ammonia synthesis loop. The purification step desirably removes excess nitrogen, along with methane and argon, from the feed gas. The compressed feed gas flows via stream 306 to first cross exchanger 308, where it is heated to 234° C. (453° F.), and then via stream 310 to second cross exchanger 312, where the feed gas is further heated to 357° C. (675° F.). The heated feed flows via path 314 to a radial flow magnetite converter 316, having a magnetite catalyst bed and enters the converter via inlet 318. Desirably, magnetite converter 316 can have more than one catalyst bed. After cooling in magnetite heat exchanger 317, effluent from the magnetite converter 316 exits via outlet 320, at a temperature in this example of 392° C. (737° F.) and a pressure of 9.18 MPa. The effluent is cooled via second cross exchanger 312 to a temperature of 266° C. (511° F.). The effluent is further cooled via first heat exchanger 322 to a temperature of 217° C. (423° F.) and a pressure of 9.11 MPa.

The cooled effluent 324 enters converter 326 via inlet 328, flows through a series of baffles in indirect heat exchange with the catalyst tubes 330, flows to the inlet end 331 of the catalyst tube 330, and exits catalyst tubes 330 and reactor 326 via outlet 334. The catalyst tubes 330 can consist of alternating layers of catalyst and inert spacers, as previously discussed and shown in FIG. 2, thereby creating reactive and non-reactive zones in each catalyst tube 330. The catalyst can be a ruthenium based catalyst, desirably promoted ruthenium on a heat stabilized graphitic carbon support, although other similar high activity catalysts or support materials can be used. The ammonia effluent from the converter 326 has a temperature of 373° C. (703° F.) and a pressure of 8.90 MPa, in this example. Total pressure drop for the converter is desirably less than 0.2 MPa.

The hot ammonia effluent exiting the converter 326 is available for heat recovery and flows via line 338 to magnetite converter heat exchanger 317 where it is heated to a temperature of 448° C. (839° F.). The ammonia stream exits the magnetite converter via 343 and passes through second heat exchanger 344 and exits the second heat exchanger 344 via line 345 where the ammonia stream has cooled to a temperature of 261° C. (502° F.). Stream 345 flows into first cross exchanger 308 for further cooling and into line 348 where the cooled ammonia stream has a temperature of 87° C. (188° F.) and a pressure of 8.76 MPa, and flows into chilled water cooler 350. The cooled ammonia enters a conventional refrigeration unit 354 via line 352, where the reactor effluent can be split into three streams. Stream 356 recycles a mixture of ammonia and hydrogen to the compressor 304 via line 362 where it is combined with synthesis gas 302, or alternatively, separates out ammonia and hydrogen via conventional ammonia recovery unit 363 and provides a hydrogen stream 364 for desulfurization, for example. The purge gas can be further processed in a membrane hydrogen-recovery unit, which can recover up to 90% of the hydrogen for recycle. Waste gas from the membrane separator can be combined with other purge gas streams generated by the process and used as supplemental fuel. Stream 358 provides a mixture which can either be recycled to a purification unit (not shown) for hydrogen recovery or purged to fuel for the reactors (not shown). Stream 360 provides a purified ammonia product stream.

The converter can be designed to operate with one of two goals in mind: (a) minimizing the catalyst usage or (b) maximizing the ammonia conversion. In the first scenario, the converter can operate using a lower catalyst volume, while still obtaining high ammonia yields. Thus, the converter can operate with lower catalyst costs than similar catalyst systems employing adiabatic reactor beds. In the second scenario, the reactor can be operated using a larger catalyst volume than the first scenario, thereby obtaining greater ammonia conversion at reduced catalyst efficiency.

The converter can be well suited for debottlenecking existing plants, thereby increasing production and/or productivity. The converter can be installed as an "add-on" feature to an existing plant for recovery and conversion of purge gas streams. Because the converter can be deployed in a retrofit application as an "add-on" converter to supplement ammonia production from one or more existing ammonia synthesis plants, base production can be unaffected during installation. In addition, very little plant downtime would be experienced during the retrofit turnaround shutdown to make the required tie-ins to complete the retrofit installation.

Figure 9:
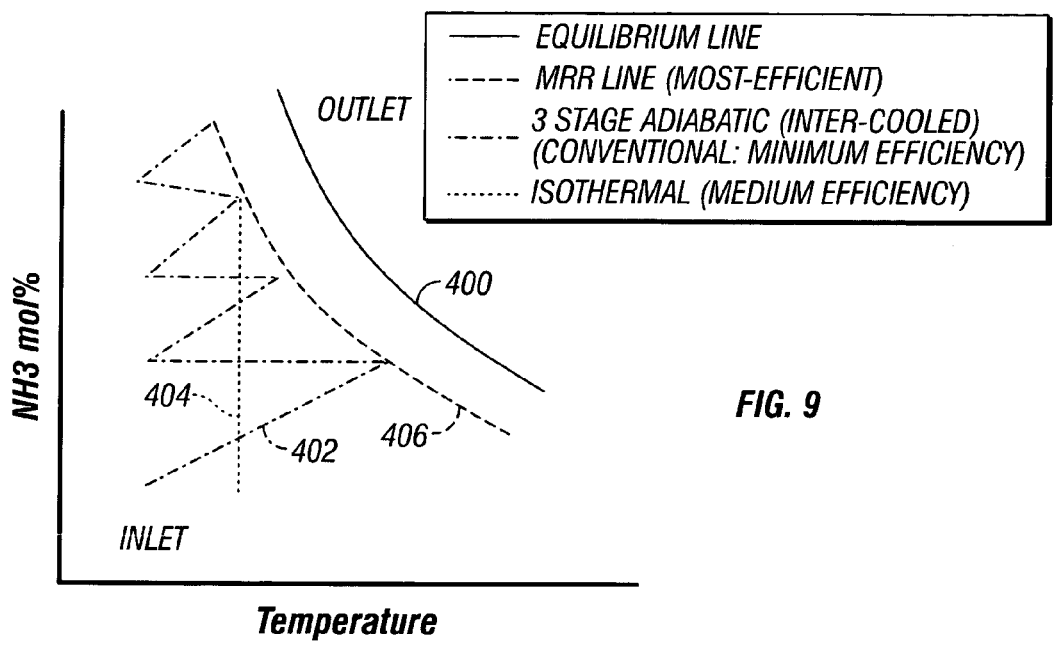
FIG. 9 is a graphical illustration comparing the ammonia conversion and temperatures of staged adiabatic (intercooled) ammonia converters and isothermal ammonia converters of the prior art, with a converter according to an embodiment of the present invention.

The converter demonstrates an ability to provide higher conversion of feed by closely approximating the equilibrium line for the reaction. FIG. 9 illustrates a comparison between theoretical temperature:ammonia conversion curves for the reaction equilibrium line 400, a three-stage adiabatic inter-cooled reactor 402, an isothermal reactor 404, and a reactor 406. The theoretical reaction equilibrium line 400, as shown in FIG. 9, demonstrates that with an unlimited residence time, conversion increases with decreasing temperature. The three-stage adiabatic reactor 402 employs a series of three inter-coolers to reduce the temperature between stages in the reactor and increase the ammonia conversion. The heating and cooling cycles are discernable as there is no conversion during the cooling step. Conversion and rate of reaction using an isothermal reactor 404 is limited by the temperature at which the reaction is run. As shown in FIG. 9, the reactor 406 provides high conversion efficiency as the reactor provides increased conversion as temperature decreases, following that of the calculated reaction equilibrium.

Catalyst requirements can be significantly reduced and ammonia conversion for the reactor can be improved when compared with the staged adiabatic and isothermal reactors. For example, to achieve equivalent single-pass conversions using a high-activity ammonia catalyst, the catalyst requirements for the present invention reactor, in some embodiments, can be approximately 30% less than that required for the staged adiabatic reactor. Whereas typical ammonia conversion processes in staged adiabatic reactors exhibit single-pass conversions yielding ammonia concentrations in the reactor effluent of approximately 20.6 mol %, the reactor of the present invention is capable of achieving single pass conversions yielding ammonia concentrations in the reactor effluent greater than 22 mol %, and in some embodiments greater than 22.8 mol % when using an excess catalyst load of a high-activity ruthenium-based catalyst.

Figure 10:
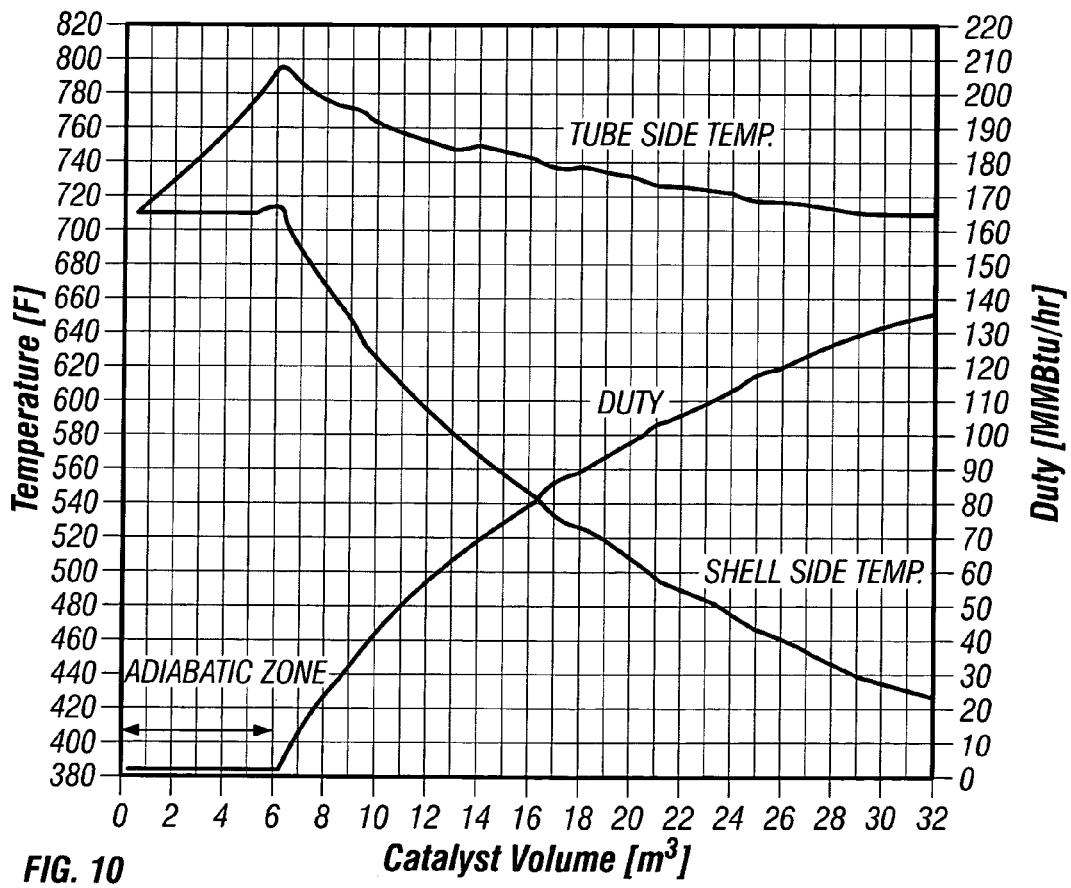
FIG. 10 is a converter loadsheet illustrating the duty, shell-side and tube-side temperatures as a function of cumulative catalyst volume according to an embodiment of an ammonia converter according to the present invention.

The reactor can have between 200 and 10,000 catalyst tubes, desirably between 1,500 and 2,500 catalyst tubes. Each reactor can contain between approximately 30 and 35 $m^3$ of ruthenium-based catalyst, loaded in catalyst tubes interspaced with non-reactive inserts as previously described and shown in FIG. 2. FIG. 10 shows the temperature change for both the tube and shell side of the reactor per cubic meter of catalyst, as well as total heat produced at a particular volume of catalyst in a simulation example, for one embodiment of the invention. As shown, the first 1 to 6 $m^3$ of catalyst is assumed to be a generally adiabatic zone, where the reaction can proceed without transfer of all or a portion of the heat generated by the exothermic reaction. In this example, shell side temperature in the generally adiabatic zone remains essentially constant while the tube side temperature increases to a maximum of between 416-427° C. (780-800° F.). Heat transfer begins after the generally adiabatic zone, and totals between 135 and 150 GJ (130 and 140 MMBtu).

Figure 11:
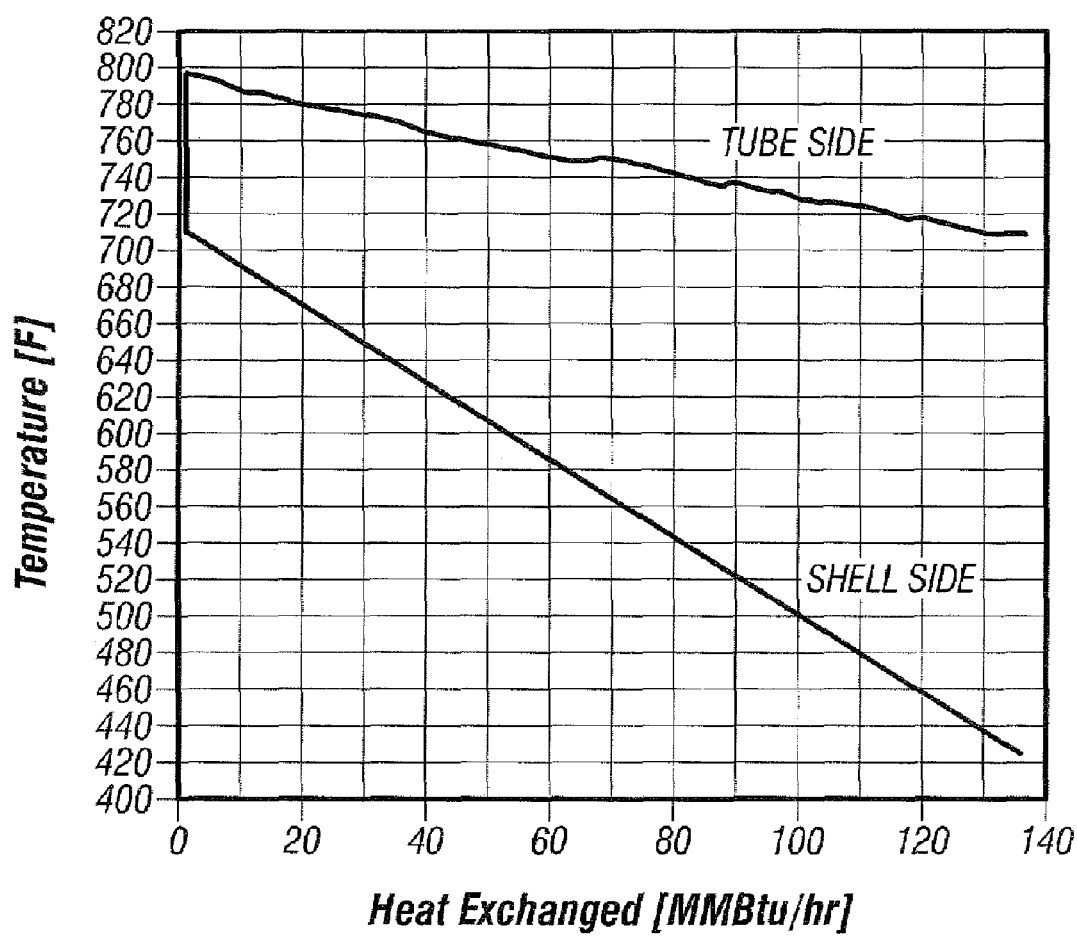
FIG. 11 shows cooling/heating curves illustrating shell-side and tube-side temperatures as a function of cumulative heat exchanged according to the embodiment of FIG. 10.

FIG. 11 shows a heating and cooling curve for the tube and shell sides of the reactor simulation of FIG. 10 as a function of cumulative heat exchanged. Downstream from the generally adiabatic zone, the temperature of the tube side decreases from approximately 416-427° C. (780-800° F.) to approximately 377° C. (710° F.). The linear relationship between the tube side and shell side temperatures demonstrates good heat exchange.

Figure 12:
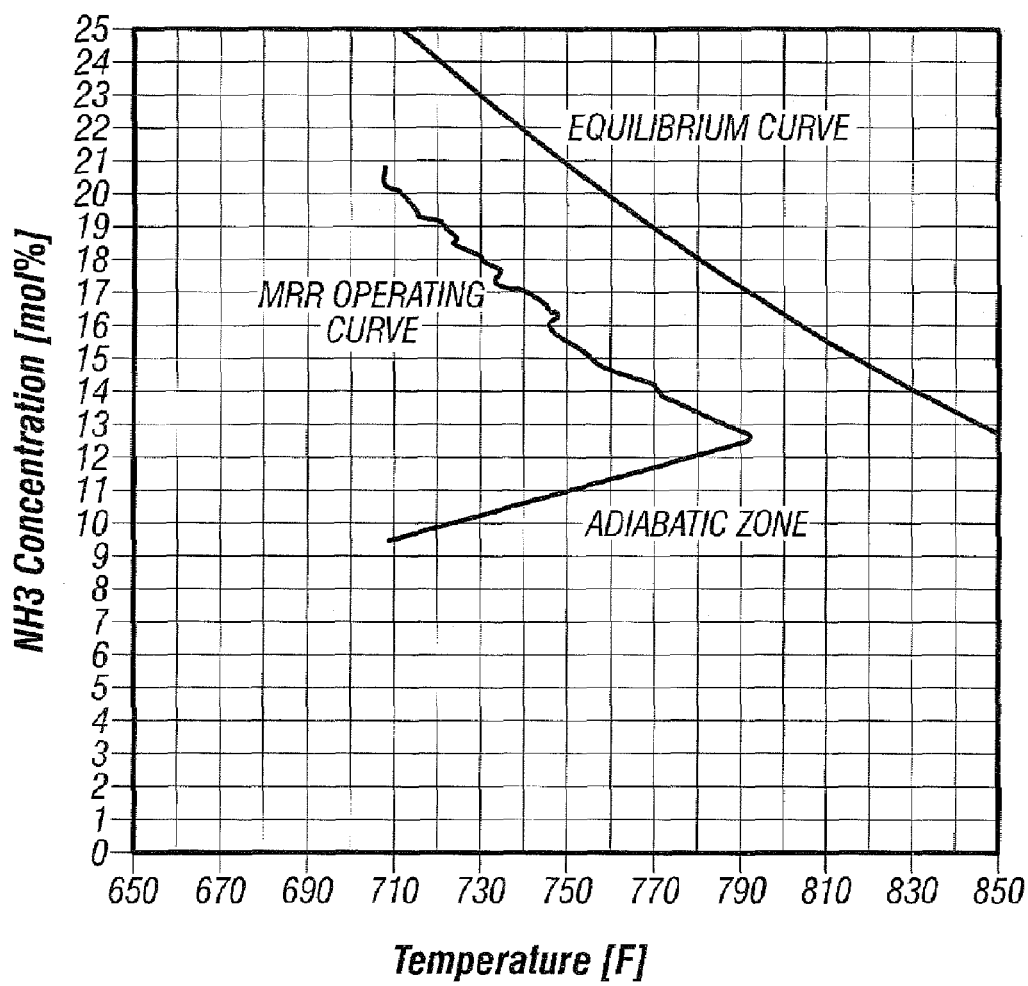
FIG. 12 is a converter loadsheet illustrating the ammonia concentration as a function of tube-side temperature relative to the equilibrium curve according to the embodiment of FIGS. 10-11.

FIG. 12 shows ammonia concentration as a function of tube side temperature relative to the equilibrium for the reaction for the simulation of FIGS. 10-11. Tube side temperature in the generally adiabatic zone shows a steady increase in temperature to approximately 421° C. (790° F.), at which point the operating curve begins to parallel the equilibrium curve for the reaction with the reaction temperature being maintained within 4-15° C. (40-60° F.) of the equilibrium temperature for the same ammonia concentration and the ammonia content of the reactant gases at 4-6 mol % below the equilibrium ammonia content at the same reaction temperature. The decrease in temperature is obtained because the indirect heat exchange between the shell side feed and the catalyst tube exceeds the heat of reaction by a controlled amount. The composition of the feed gas to the reactor in this example is approximately 55.9% $H_2$, 29.0% $N_2$, 3.9% $CH_4$, 1.9% Ar, and 9.2% $NH_3$. Feed to the shell side inlet has an initial temperature of 217° C. (423° F.). Product effluent has a composition of approximately 46.1% $H_2$, 26.9% $N_2$, 4.3% $CH_4$, 2.1% Ar, and 20.6% $NH_3$. Total conversion as shown in FIG. 12 is in excess of 20% at an output temperature of between 371-377° C. (700-710° F.), and a pressure of approximately 8.85 MPa.

Figure 13:
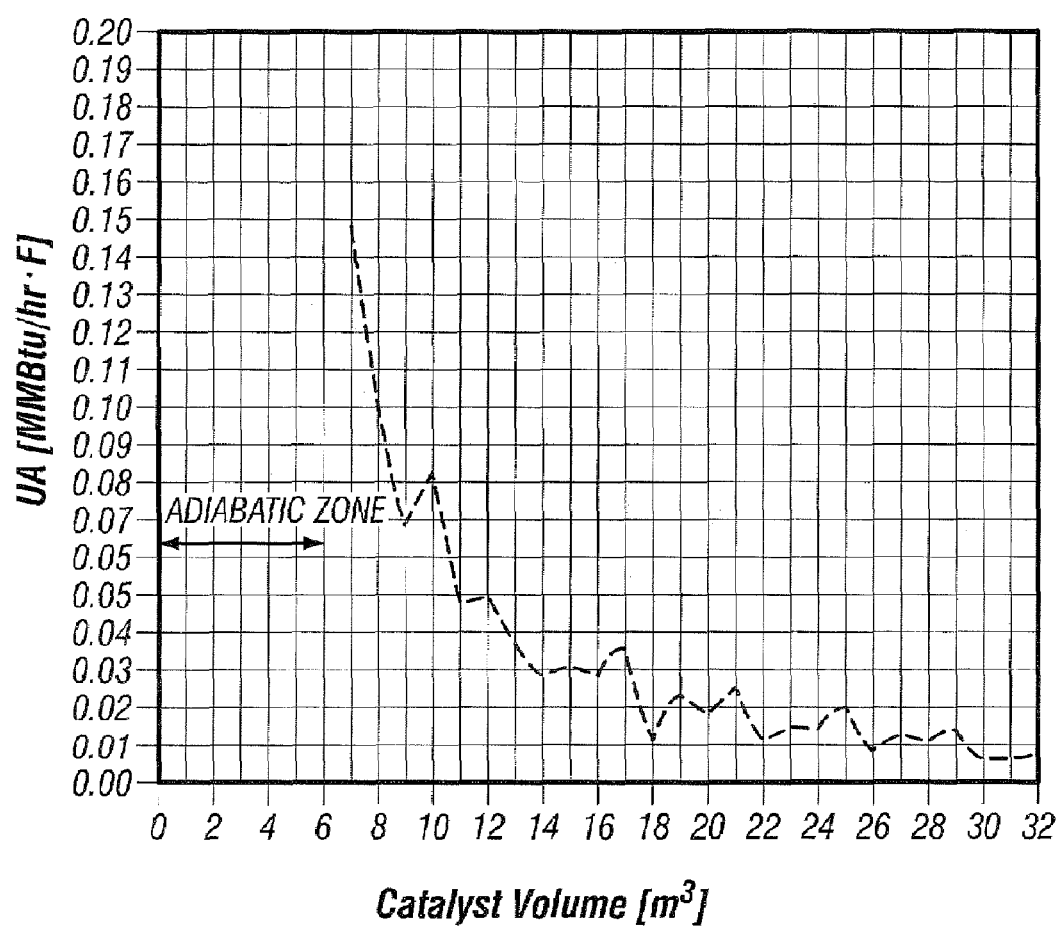
FIG. 13 is a graph of the overall heat transfer coefficient as a function of cumulative catalyst volume according to the embodiment of FIGS. 10-12.

The product of the heat transfer coefficient times the surface area (UA) necessary to keep the reactor running parallel to the equilibrium curve of FIG. 12 is shown in FIG. 13. The required UA is greatest at the initial part of the reaction, after the generally adiabatic zone. The UA required at the inlet of the catalyst zone is approximately 14 times greater than that required at the outlet, and can be achieved through the use of extended surfaces, varied surface area, non-reactive spacers, baffles, or the like.

The reactor can achieve increased ammonia conversion and catalyst efficiency by controlling temperature in the catalyst tube. Increased heat transfer between the catalyst tube and the effluent on the shell side of the reactor can be achieved through the use of non-reactive inserts placed inside the interior of the catalyst tubes, as shown in FIG. 2. These inserts can increase the surface area available for heat transfer for an equivalent volume of catalyst. Alternatively, portions of the feed can be introduced at the bottom of the reactor, and preheated by the baffles. One or more additional portion of the feed can be introduced to the reactor at a point or various points below the inlet of the catalyst tube, desirably at locations below the generally adiabatic zone. The catalyst tubes can include fins at the top portion of the catalyst tube to increase surface area for heat transfer. This can be desirable when the shell side heat transfer coefficient is dominant. Alternatively, the baffle spacing between adjacent baffles can be varied such that the spacing decreases toward the top of the catalyst tube, i.e. the spacing between baffles is greater at the bottom of the reactor than at the top of the reactor. Catalyst tube shapes can also be varied to increase catalyst volume at different portions of the tube. For example, the catalyst tube can use a slightly conical shape, rather than a cylindrical shape, providing a greater catalyst volume per tube area at the bottom of the catalyst tube than at the top of the catalyst tube.

The converter in one embodiment of the present invention can be used to treat purge gas for incremental increases in the production of ammonia. In ammonia synthesis loops, a purge stream can be employed to remove inert gases that may accumulate in the loop. The purge stream typically contains ammonia, $H_2$, $N_2$ and inert gases ($CH_4$, Ar and He). The purge stream can be processed to remove ammonia and/or hydrogen, and used as a fuel gas. In the case of the present converter, the purge flow rate can be increased significantly to reduce the amount of inert gases at the main inlet to the converter. In the practice of prior art processes, increasing the purge rate can be uneconomical because it can lead to the wasting of high pressure syngas and the compression power of the product increases. The converter can convert the bulk of the $H_2$ and $N_2$ in the purge gas to ammonia, and the net purge gas flow rate can be maintained. The converter can be used for debottlenecking, or providing incremental production for a number of ammonia plants located at the same location, as the purge stream from each plant can be supplied to, and processed in, a single converter.

The invention is described above in reference to specific examples and embodiments. The metes and bounds of the invention are not to be limited by the foregoing disclosure, which is illustrative only, but should be determined in accordance with the full scope and spirit of the appended claims. Various modifications will be apparent to those skilled in the art in view of the description and examples. It is intended that all such variations within the scope and spirit of the appended claims be embraced thereby.

What is claimed is:

1. A conversion process for ammonia synthesis, comprising:

introducing a reactant-rich stream comprising hydrogen and nitrogen at a feed temperature into a shell-side passage of a shell-and-tube heat exchanging reactor to pre-heat the reactant-rich stream to an inlet temperature;

introducing the pre-heated reactant-rich stream from the shell-side passage at the inlet temperature into a reaction zone containing a plurality of catalyst-containing tubes to convert the hydrogen and nitrogen to ammonia to form an ammonia-enriched mixture of hydrogen, nitrogen and ammonia;

indirectly transferring heat from the tubes to the reactant-rich stream at a rate effective to maintain the mixture in the tubes below equilibrium temperature, wherein the heat transfer rate in a decreasing-temperature section of the reaction zone exceeds heat of reaction to lower the temperature of the mixture to a discharge temperature; and recovering an effluent at the discharge temperature from outlet ends of the tubes enriched in ammonia and lean in nitrogen and hydrogen.

2. The method of claim 1, wherein the catalyst comprises a platinum group metal.

3. The method of claim 1, wherein the catalyst comprises ruthenium on a carbon support.

4. The method of claim 1, wherein the tubes comprise an initial temperature-increasing zone adjacent an inlet of the reaction passage wherein a heat of reaction exceeds the rate of heat transfer and the temperature of the gas mixture is increasing.

5. The method of claim 1, wherein the tubes comprise a series of alternating catalyst-containing zones and reaction-limited zones.

6. The method of claim 1, wherein the mixture in the decreasing temperature section is maintained at a temperature within 30° C. of the equilibrium temperature for the reaction.

7. The method of claim 1 further comprising passing the reactant-rich stream through an upstream reactor comprising magnetite catalyst, and supplying an effluent from the magnetite reactor in series as the reactant-rich stream introduced shell-side to the shell-and-tube heat exchanging reactor.

8. The method of claim 1, wherein the reactant-rich stream introduced shell-side to the shell-and-tube heat exchanging reactor comprises a purge gas stream from an ammonia synthesis loop.

* * * * *